United States Patent
Shishido et al.

(10) Patent No.: US 10,304,228 B2
(45) Date of Patent: May 28, 2019

(54) VEHICULAR DISPLAY APPARATUS AND VEHICULAR DISPLAY METHOD

(71) Applicant: NISSAN MOTOR CO., LTD., Kanagawa (JP)

(72) Inventors: Masayuki Shishido, Kanagawa (JP); Norio Kosaka, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 15/760,888

(22) PCT Filed: Sep. 18, 2015

(86) PCT No.: PCT/JP2015/076644
§ 371 (c)(1),
(2) Date: Mar. 16, 2018

(87) PCT Pub. No.: WO2017/046937
PCT Pub. Date: Mar. 23, 2017

(65) Prior Publication Data
US 2018/0286094 A1 Oct. 4, 2018

(51) Int. Cl.
*G06T 3/40* (2006.01)
*B60K 35/00* (2006.01)
(Continued)

(52) U.S. Cl.
CPC .............. *G06T 11/60* (2013.01); *B60K 35/00* (2013.01); *G02B 27/01* (2013.01);
(Continued)

(58) Field of Classification Search
None
See application file for complete search history.

(56) References Cited

U.S. PATENT DOCUMENTS 6,373,400 B1 * 4/2002 Fujita ..................... B60K 35/00
340/901
9,436,880 B2 * 9/2016 Bos ........................ B60N 2/002
(Continued)

FOREIGN PATENT DOCUMENTS

JP 2001-63401 A 3/2001
JP 2005-67514 A 3/2005
(Continued)

*Primary Examiner* — David H Chu
(74) *Attorney, Agent, or Firm* — Osha Liang LLP (57) ABSTRACT

A vehicular display apparatus, when a host vehicle follows a preceding vehicle in front, displays a highlighting indication used to highlight the preceding vehicle over the preceding vehicle in a superimposing manner. The vehicular display apparatus includes a preceding vehicle detector that detects the preceding vehicle travelling in front of the host vehicle, a preceding vehicle distance calculator that calculates a distance between the preceding vehicle detected by the preceding vehicle detector and the host vehicle, a highlighting indication setter that sets the highlighting indication to be displayed over the preceding vehicle in a superimposing manner, and causes a highlight level of the highlighting indication to be higher when the distance between the preceding vehicle and the host vehicle calculated by the preceding vehicle distance calculator is long than when the distance is short, and a head-up display.

5 Claims, 7 Drawing Sheets

(51) Int. Cl.
*G06T 11/60* (2006.01)
*G02B 27/01* (2006.01)
(52) U.S. Cl.
CPC ............ *G02B 27/0101* (2013.01); *G06T 3/40* (2013.01); *B60K 2350/1084* (2013.01); *B60K 2350/2008* (2013.01); *B60K 2350/2052* (2013.01); *B60K 2350/352* (2013.01); *B60K 2350/965* (2013.01); *G02B 2027/0141* (2013.01)

(56) References Cited

U.S. PATENT DOCUMENTS

| | | | | |
|---|---|---|---|---|
| 2005/0149262 A1* | 7/2005 | Oikubo | ............ | G01C 21/3658 701/431 |
| 2006/0033661 A1* | 2/2006 | Swope | ............ | G01S 3/046 342/427 |
| 2010/0179741 A1* | 7/2010 | Pelosse | ............ | B60W 30/143 701/96 |
| 2010/0289632 A1* | 11/2010 | Seder | ............ | G01S 13/723 340/436 |
| 2011/0202240 A1* | 8/2011 | Rottner | ............ | B60Q 1/484 701/42 |
| 2011/0235467 A1* | 9/2011 | Bostick | ............ | A01M 29/16 367/139 |
| 2012/0249589 A1* | 10/2012 | Gassner | ............ | G02B 27/01 345/633 |
| 2013/0103299 A1* | 4/2013 | Matsuda | ............ | G06F 17/00 701/300 |
| 2015/0033174 A1* | 1/2015 | Hisatsugu | ............ | B60K 37/06 715/771 |
| 2016/0159280 A1 | 6/2016 | Takazawa et al. | | |
| 2016/0257199 A1* | 9/2016 | Bark | ............ | B60K 35/00 |
| 2017/0076599 A1* | 3/2017 | Gupta | ............ | B60Q 9/00 |
| 2017/0161009 A1* | 6/2017 | Ogisu | ............ | B60K 35/00 |
| 2018/0232944 A1* | 8/2018 | Barski | ............ | G06T 11/008 |

FOREIGN PATENT DOCUMENTS

| | | |
|---|---|---|
| JP | 2009-040107 A | 2/2009 |
| JP | 2013-015395 A | 1/2013 |
| JP | 2015-011666 A | 1/2015 |
| JP | 2015-24709 A | 2/2015 |
| WO | 2015/001796 A1 | 1/2015 |

* cited by examiner

VEHICULAR DISPLAY APPARATUS AND VEHICULAR DISPLAY METHOD

BACKGROUND

Technical Field

The present invention relates to a vehicular display apparatus and method that, when a host vehicle follows a preceding vehicle in front, displays a highlighting indication over the preceding vehicle in a superimposing manner.

Related Art

Patent Literature 1 discloses a conventional vehicular display apparatus adapted for autonomous cruise control, which enables a host vehicle to follow a preceding vehicle travelling in front. The vehicular display apparatus disclosed in Patent Literature 1 uses a head-up display to highlight the following-target preceding vehicle by superimposing a highlighting indication over the preceding vehicle.

Patent Literature 1: Japanese Patent Application Publication No. 2005-67514

SUMMARY OF INVENTION

In the above-described conventional vehicular display apparatus, when the following-target preceding vehicle becomes far away from the host vehicle, the highlighting indication superimposed over the preceding vehicle gets smaller, making it difficult for the driver to recognize the highlighting indication.

One or more embodiments of the present invention provides a vehicular display apparatus and method that enables a driver to easily recognize a highlighting indication even when the following-target preceding vehicle is far away from the host vehicle.

A vehicular display apparatus and method according to one or more embodiments of the present invention detects a preceding vehicle travelling in front of a host vehicle, calculates the distance between the preceding vehicle and the host vehicle, and sets a highlighting indication to be displayed over the preceding vehicle in a superimposing manner. The vehicular display apparatus causes the highlight level of the highlighting indication to be higher when the distance between the preceding vehicle and the host vehicle is long than when the distance is short, and displays an image of the thus-set highlighting indication on a display area provided so as to overlap with the position of the front window of the host vehicle.

One or more embodiments of the present invention enables a driver to easily recognize a highlighting indication even when the following-target preceding vehicle is far away from the host vehicle.

DETAILED DESCRIPTION

Embodiments of the present invention are described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

[Configuration of the Vehicular Display Apparatus]

Figure 1:
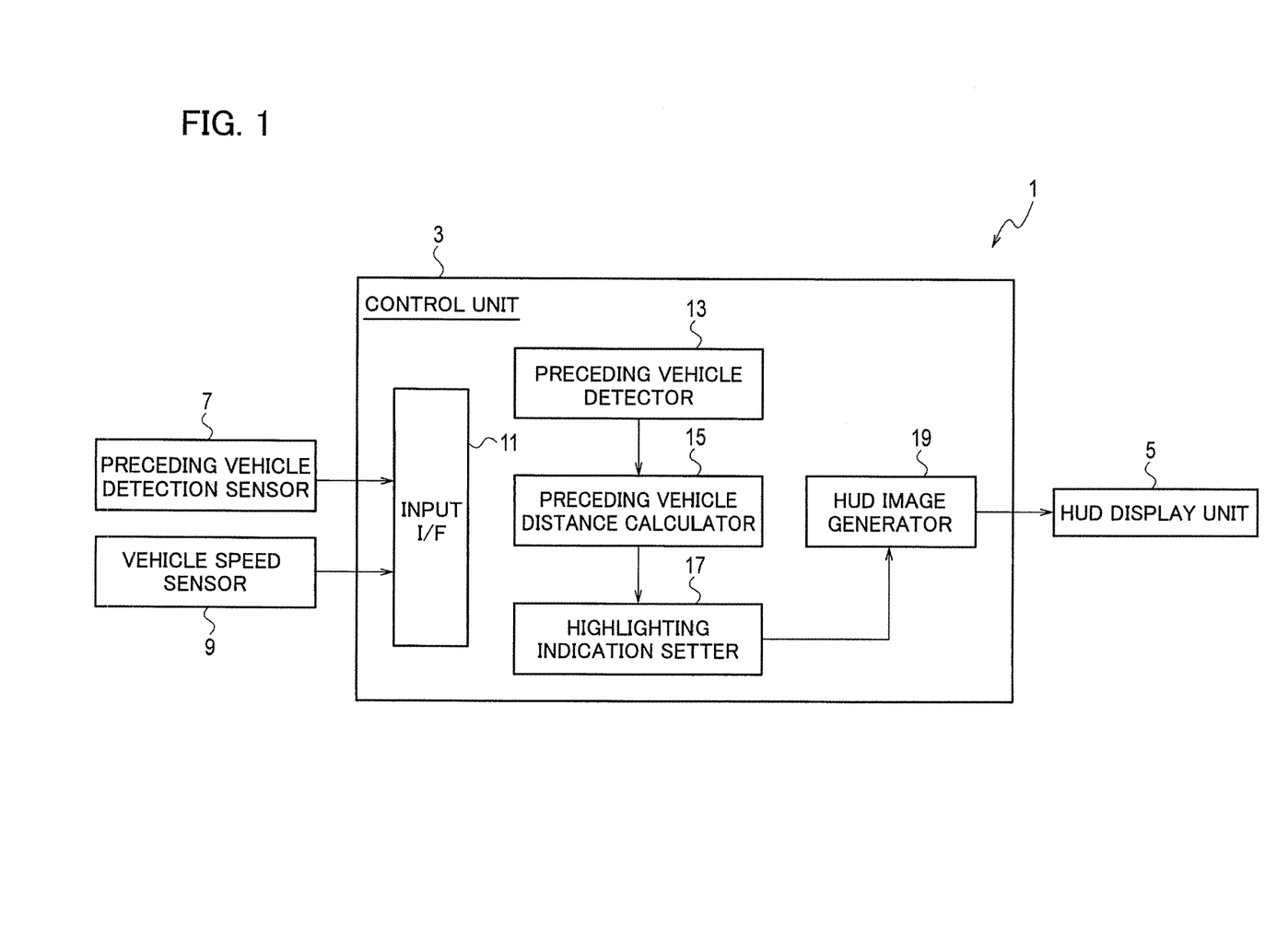
FIG. 1 is a block diagram illustrating the configuration of a vehicular display apparatus according to one or more embodiments of the present invention.

FIG. 1 is a block diagram illustrating the configuration of a vehicular display apparatus according to one or more embodiments of the present invention. As illustrated in FIG. 1, a vehicular display apparatus 1 according to one or more embodiments of the present invention includes a control unit 3 and a HUD display unit 5. Further, the vehicular display apparatus 1 is connected to sensors and the like mounted on the vehicle, and connected in particular to a preceding vehicle detection sensor 7 and a vehicle speed sensor 9. The vehicular display apparatus 1 thus configured is mounted on a vehicle, and the vehicle mounted with the vehicular display apparatus 1 is equipped with a system such as autonomous cruise control or adaptive cruise control, for following a preceding vehicle in front of the host vehicle. The vehicular display apparatus 1 is an apparatus that displays a highlighting indication through the front window of the vehicle using a head-up display (HUD) by superimposing the highlighting indication over the following-target preceding vehicle.

The control unit 3 is a controller that controls highlighting indication and outputs an image of the highlighting indication to the HUD display unit 5. The control unit 3 includes an input interface 11, a preceding vehicle detector 13, a preceding vehicle distance calculator 15, a highlighting indication setter 17, and a HUD image generator 19.

The input interface 11 is connected to the sensors and the like mounted on the vehicle, in particular the preceding vehicle detection sensor 7 and the vehicle speed sensor 9, and transmits and receives data necessary for control of highlighting indication.

The preceding vehicle detector 13 detects a preceding vehicle travelling in front of the host vehicle. Specifically, the preceding vehicle detector 13 acquires preceding vehicle information from the preceding vehicle detection sensor 7, and detects a following-target preceding vehicle based on an image of the scene in front of the host vehicle, radar measurement results, and/or the like, included in the preceding vehicle information.

The preceding vehicle distance calculator 15 calculates the distance between the preceding vehicle detected by the preceding vehicle detector 13 and the host vehicle. Specifically, the preceding vehicle distance calculator 15 may calculate the distance between the preceding vehicle and the host vehicle by analyzing an image of a front camera included in the preceding vehicle detection sensor 7, or may calculate the distance between the preceding vehicle and the host vehicle based on measurement results of a radar included in the preceding vehicle detection sensor 7.

The highlighting indication setter 17 sets a highlighting indication to be displayed over the following-target preceding vehicle in a superimposing manner, and causes the highlight level of the highlighting indication to be higher when the distance between the preceding vehicle and the host vehicle is long than when the distance is short. The highlighting indication setter 17 first sets the display position, display size, spatial frequency, brightness, and/or the like of a following mark to be displayed as a highlighting indication. The highlighting indication setter 17 then causes the highlight level of the thus-set following mark to be higher when the distance between the preceding vehicle and the host vehicle is long than when the distance is short. For example, the highlighting indication setter 17 raises the highlight level by increasing the size of the following mark as the distance between the preceding vehicle and the host vehicle increases. Alternatively, the highlighting indication setter 17 may raise the highlight level by increasing the spatial frequency or brightness of the following mark as the distance between the preceding vehicle and the host vehicle increases. Note that the following mark is an indication mark used to highlight the following-target preceding vehicle, and is displayed in a superimposing manner near the preceding vehicle, at a position adjacent to, e.g., below, the preceding vehicle.

Further, in the case where the distance between the preceding vehicle and the host vehicle is a predetermined distance or shorter, the highlighting indication setter 17 causes the highlight level of the highlighting indication to be lower when the distance between the preceding vehicle and the host vehicle is short than when the distance is long. For example, the highlighting indication setter 17 lowers the highlight level by decreasing the size of the following mark as the distance between the preceding vehicle and the host vehicle decreases. Alternatively, the highlighting indication setter 17 may lower the highlight level by decreasing the spatial frequency or brightness of the following mark as the distance between the preceding vehicle and the host vehicle decreases.

The HUD image generator 19 generates images of a head-up display for displaying a following mark, which is a highlighting indication, according to the settings made by the highlighting indication setter 17.

Note that the control unit 3 is formed by a general-purpose electronic circuit including a microcomputer, a microprocessor, and a CPU and a peripheral such as memory. By executing particular programs, the control unit 3 operates as the above-described preceding vehicle detector 13, preceding vehicle distance calculator 15, highlighting indication setter 17, and HUD image generator 19.

The HUD display unit 5 is a head-up display including a projector for projecting images, a screen and Fresnel mirrors for reflecting the images, and the like, and is configured to display an image of the highlighting indication on a display area provided so as to overlap with the position of the front window of the vehicle. In particular, the HUD display unit 5 is a head-up display capable of displaying an image over the scene in front of the vehicle in a superimposing manner by projecting a mirror-reflected image beyond the front window as a virtual image. The HUD display unit 5 is, however, not limited to a head-up display of such a type. For example, the HUD display unit 5 may be of a combiner type using a transparent panel instead of the front window to display an image, or a type displaying an image directly on the front window. In other words, the head-up display of one or more embodiments of the present invention only has to be capable of displaying information by superimposing the information over the scene that the driver is viewing through the front window without lowering the head of the driver. Note that the HUD display unit 5 corresponds to the display unit in one or more embodiments of the present invention.

The preceding vehicle detection sensor 7 is a sensor for detecting a preceding vehicle, such as a front camera or a millimeter-wave radar, and outputs preceding vehicle information including a front camera image or millimeter-wave-radar measurement results. Besides the front camera or millimeter-wave radar, the preceding vehicle detection sensor 7 may include an infrared sensor, an inter-vehicle distance sensor, and/or the like. The vehicle speed sensor 9 detects the speed of the vehicle based on a pulse signal indicative of the number of rotations of the axle.

[Procedure of Following Mark Display Processing]

Next, a procedure of following mark display processing performed by the vehicular display apparatus 1 according to one or more embodiments of the present invention is described with reference to the flowchart in FIG. 2.

Figure 2:
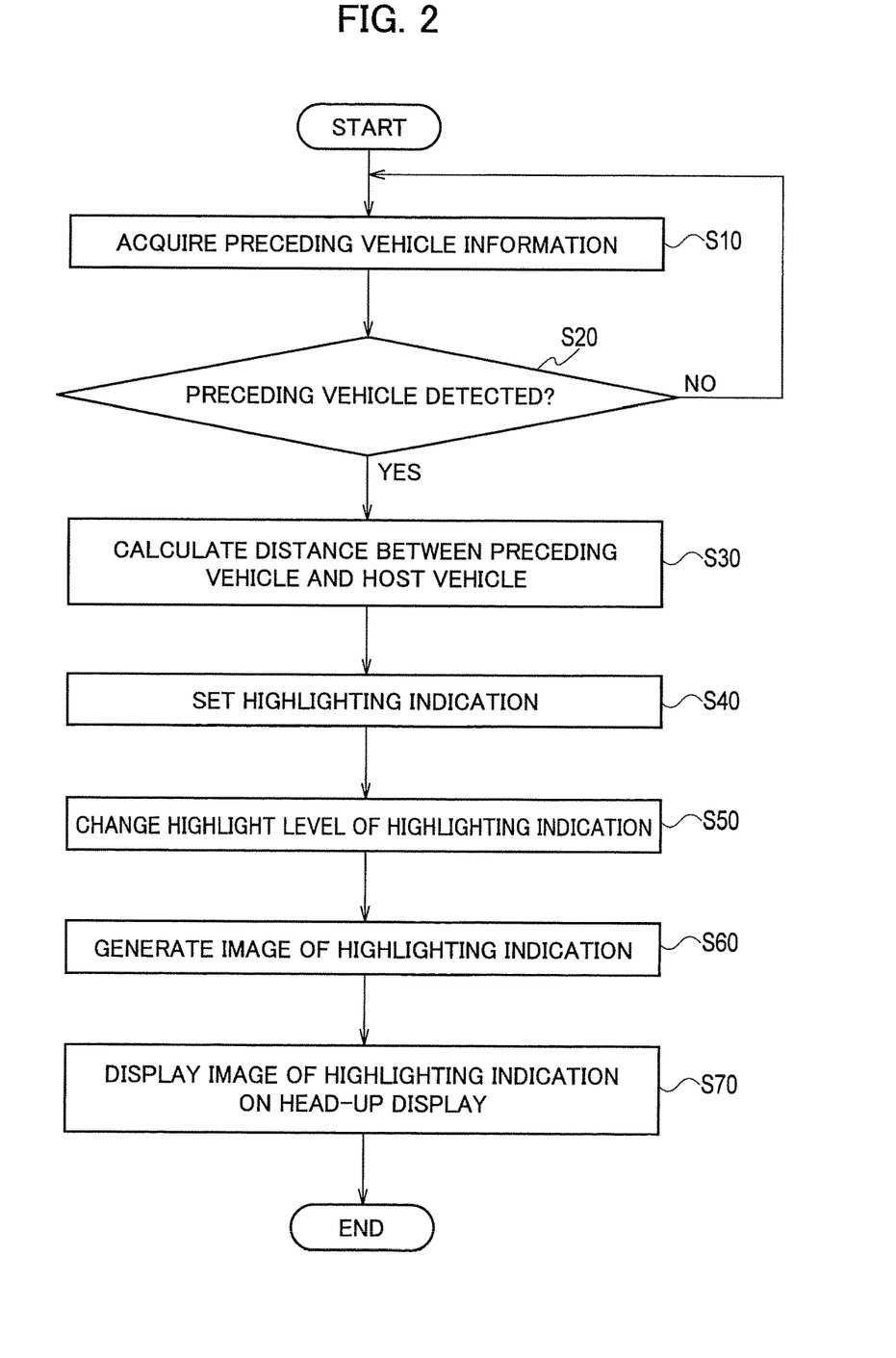
FIG. 2 is a flowchart illustrating a processing procedure of following mark display processing performed by the vehicular display apparatus according to one or more embodiments of the present invention.

As illustrated in FIG. 2, first in Step S10, the preceding vehicle detector 13 acquires preceding vehicle information from the preceding vehicle detection sensor 7 to acquire a front camera image or radar measurement results included in the preceding vehicle information.

In Step S20, the preceding vehicle detector 13 analyzes the front camera image and determines whether or not the preceding vehicle detector 13 detects a preceding vehicle travelling in front of the host vehicle. If the preceding vehicle detector 13 cannot detect a preceding vehicle, the processing returns to Step S10. If being able to detect a preceding vehicle, the preceding vehicle detector 13 determines that the detected preceding vehicle is a following-target preceding vehicle, and the processing proceeds to Step S30.

In Step S30, the preceding vehicle distance calculator 15 calculates the distance between the preceding vehicle detected in Step S20 and the host vehicle. The preceding vehicle distance calculator 15 may calculate the distance between the following-target preceding vehicle and the host vehicle based on the radar measurement results, or may calculate the distance between the preceding vehicle and the host vehicle by analyzing the front camera image.

In Step S40, the highlighting indication setter 17 makes settings regarding a highlighting indication to be displayed over the preceding vehicle in a superimposing manner. In one or more embodiments of the present invention, to highlight the preceding vehicle that the host vehicle is following, a following mark is displayed as a highlighting indication. To this end, the highlighting indication setter 17 sets the display position and the display size of the following mark. First, the highlighting indication setter 17 sets a rectangular frame surrounding the preceding vehicle on the front camera image, and defines a base point at the center of the frame. Then, the highlighting indication setter 17 sets the display position of the following mark to a position a predetermined distance below the base point. Note that the predetermined distance is set based on the distance between the preceding vehicle and the host vehicle.

Figure 3:
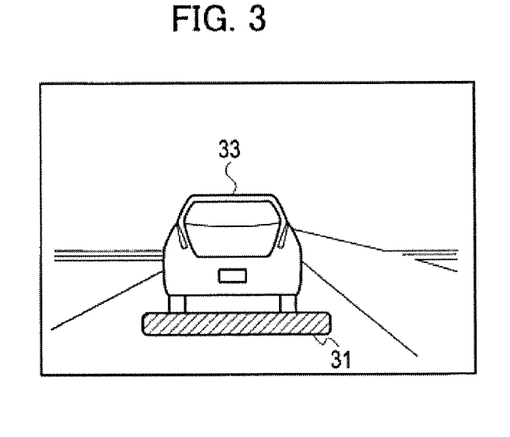
FIG. 3 is a diagram illustrating an example of a following mark displayed by the vehicular display apparatus according to one or more embodiments of the present invention.

Next, the highlighting indication setter 17 sets the display size of the following mark. The display size of the following mark may be set based on the size of the preceding vehicle on the image or based on the distance between the preceding vehicle and the host vehicle. For example, a following mark 31 is set to be slightly wider than a preceding vehicle 33 as illustrated in FIG. 3. After setting the display position and display size of the following mark as described above, the highlighting indication setter 17 places, in the 3D space of the vehicle, the following mark in the set display size at the set display position. Then, as illustrated in FIG. 3, the following mark 31 appears to be displayed adjacent to the preceding vehicle 33 in a superimposing manner. Although rectangular or bar-shaped in FIG. 3, the following mark 31 may be in other shapes, such as a rectangular frame surrounding the preceding vehicle, a triangle, a star, or an arrow. The brightness, spatial frequency, and the like of the following mark 31 are set in advance, and such predetermined values are used to display the following mark 31. After the display position and display size of the following mark are set as described above, the processing proceeds to Step S50.

Figure 4A:
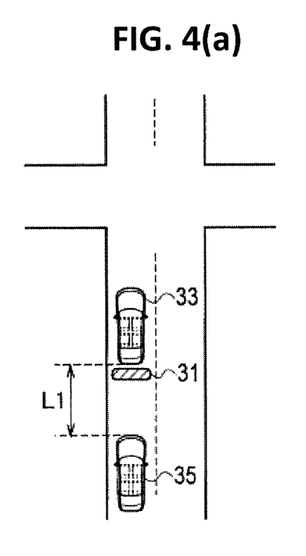
FIGS. 4(a)-4(b) are diagrams illustrating how a following mark is displayed by the vehicular display apparatus according to one or more embodiments of the present invention.
Figure 4B:
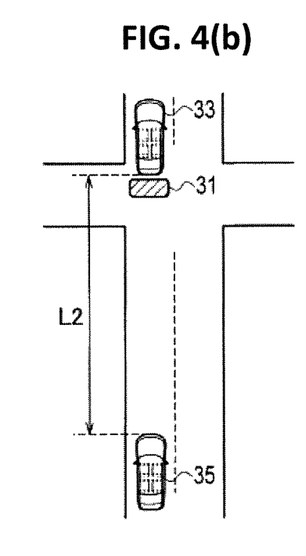
Figure 5A:
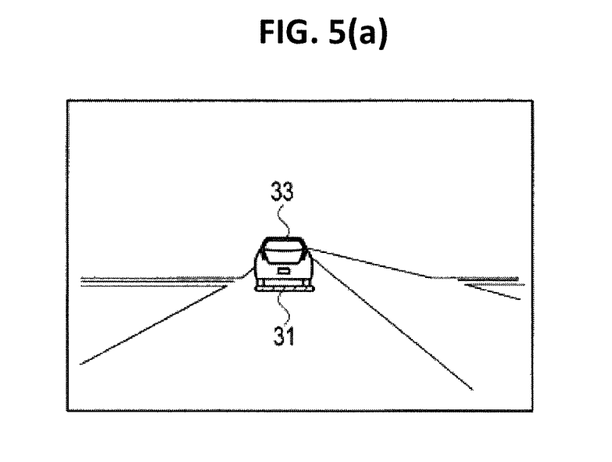
FIGS. 5(a)-5(b) are diagrams illustrating how a following mark is displayed by the vehicular display apparatus according to one or more embodiments of the present invention.
Figure 5B:
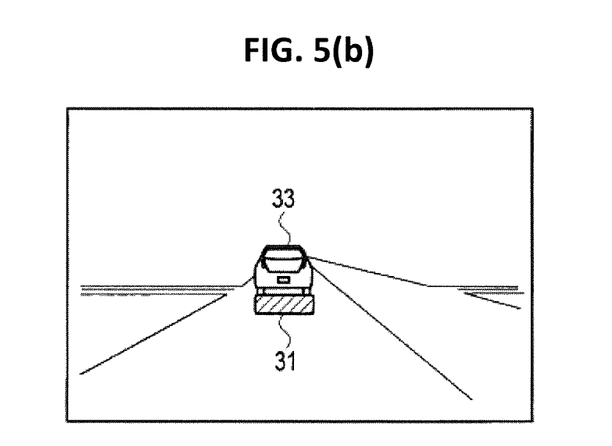

In Step S50, the highlighting indication setter 17 causes the highlight level of the highlighting indication to be higher when the distance between the preceding vehicle and the host vehicle calculated in Step S30 is long than when the distance is short. Specifically, the highlighting indication setter 17 changes the size of the highlighting indication as the highlight level of the highlighting indication. For example, when the preceding vehicle 33 is at a position a distance L1 away from the host vehicle 35 as illustrated in FIG. 4(*a*), the following mark 31 is displayed in a size easily recognizable by the driver as illustrated in FIG. 3. Then, when the preceding vehicle 33 is far away at a position a distance L2 from the host vehicle 35 as illustrated in FIG. 4(*b*), the following mark 31 gets smaller as illustrated in FIG. 5(*a*), becoming hard for the driver to see. This is because the size of the following mark 31 is set based on the size of the preceding vehicle 33 on the image or the distance between the preceding vehicle 33 and the host vehicle 35. Thus, in the case where the distance between the preceding vehicle and the host vehicle is longer than the predetermined distance L1, the highlighting indication setter 17 raises the highlight level by causing the size of the following mark 31 to be larger when the distance between the preceding vehicle and the host vehicle is long than when the distance is short. For example, as illustrated in FIG. 5(*b*), the size of following mark 31 is changed to be larger than that in FIG. 5(*a*). This way, the following mark 31 is easily recognizable to the driver even when the preceding vehicle 33 to follow is far away from the host vehicle. Note that the predetermined distance L1 may be set to an ideal inter-vehicle distance generally thought to be necessary, and the size of the following mark is set such that the following mark is easily recognizable to the driver at this inter-vehicle distance.

Figure 6A:
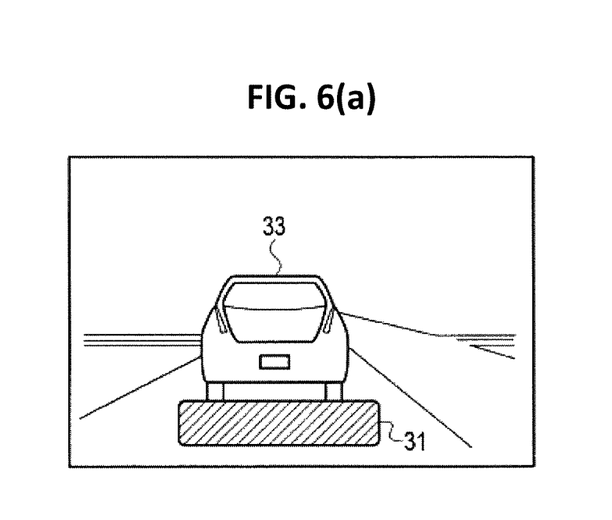
FIGS. 6(a)-6(b) are diagrams illustrating how a following mark is displayed by the vehicular display apparatus according to one or more embodiments of the present invention.
Figure 6B:
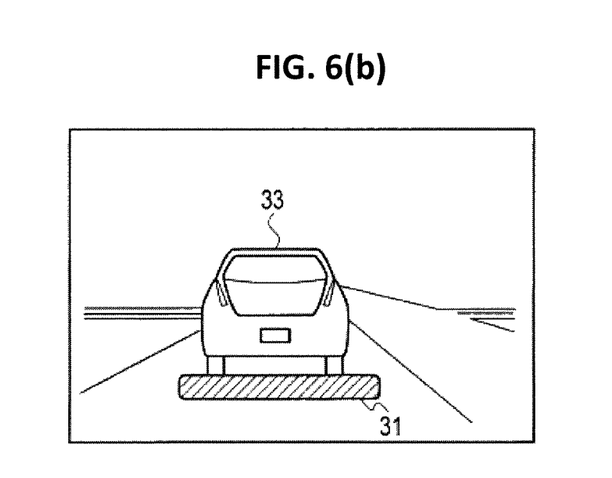

On the other hand, when the distance between the preceding vehicle and the host vehicle is the predetermined distance L1 or shorter, the following mark is displayed in too large a size, and may bother the driver. Thus, the highlighting indication setter 17 causes the highlight level of the highlighting indication to be lower when the distance between the preceding vehicle and the host vehicle is short than when the distance is long. For example, when the preceding vehicle 33 approaches the host vehicle, the following mark 31 is displayed in too large a size as illustrated in FIG. 6(*a*) and may bother the driver. Thus, when the distance between the preceding vehicle and the host vehicle is short, the highlighting indication setter 17 lowers the highlight level by causing the size of the following mark 31 to be smaller as illustrated in FIG. 6(*b*) than when the distance is long. This way, the following mark 31 does not bother the driver even when the preceding vehicle 33 to follow approaches the host vehicle, and is still easily recognizable to the driver.

Figure 7A:
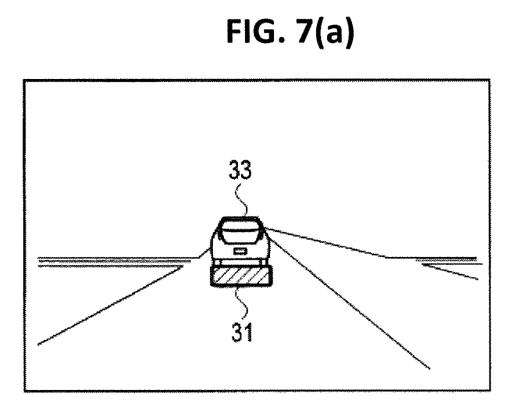
FIGS. 7(a)-7(b) are diagrams illustrating a modification of how a following mark is displayed by the vehicular display apparatus according to one or more embodiments of the present invention.

Further, the highlighting indication setter 17 may change the spatial frequency of the highlighting indication as the highlight level of the highlighting indication. Specifically, in the case where the distance between the preceding vehicle and the host vehicle is longer than the predetermined distance L1, the highlighting indication setter 17 raises the highlight level by causing the spatial frequency of the following mark 31 to be higher when the distance between the preceding vehicle and the host vehicle is long than when the distance is short. For example, as illustrated in FIG. 7(*a*), when the preceding vehicle 33 is far away from the host vehicle, the following mark 31 is increased in spatial frequency and displayed with prominent edges. This way, the following mark 31 is easily recognizable to the driver even when the preceding vehicle 33 to follow is far away from the host vehicle.

Figure 7B:
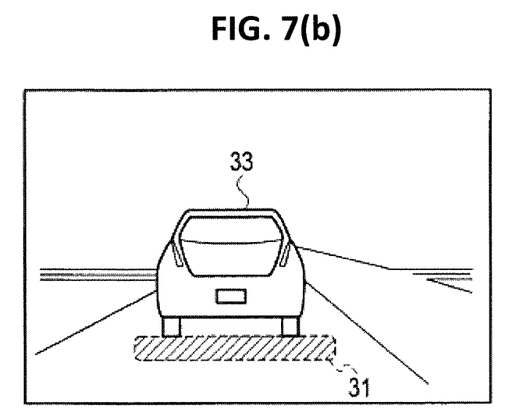

On the other hand, in the case where the distance between the preceding vehicle and the host vehicle is the predetermined distance L1 or shorter, the highlighting indication setter 17 lowers the highlight level by causing the spatial frequency of the following mark 31 to be lower when the distance between the preceding vehicle and the host vehicle is short than when the distance is long. For example, as illustrated in FIG. 7(*b*), when the preceding vehicle 33 approaches the host vehicle, the following mark 31 is decreased in spatial frequency and displayed with blurry edges. This way, the following mark 31 does not bother the driver even when the preceding vehicle 33 to follow approaches the host vehicle, and is still easily recognizable to the driver.

Figure 8A:
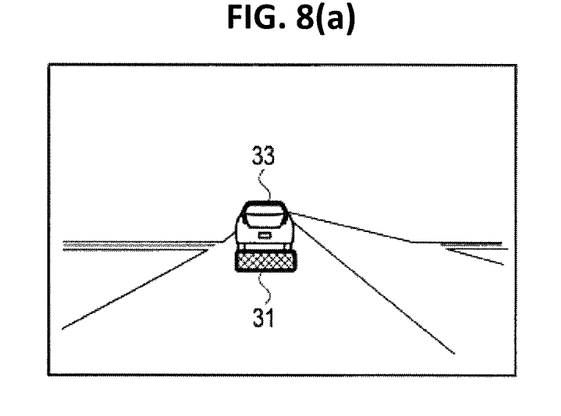
FIGS. 8(a)-8(b) are diagrams illustrating a modification of how a following mark is displayed by the vehicular display apparatus according to one or more embodiments of the present invention.

Further, the highlighting indication setter 17 may change the brightness of the highlighting indication as the highlight level of the highlighting indication. Specifically, in the case where the distance between the preceding vehicle and the host vehicle is longer than the predetermined distance L1, the highlighting indication setter 17 raises the highlight level by causing the brightness of the following mark 31 to be higher when the distance between the preceding vehicle and the host vehicle is long than when the distance is short. For example, as illustrated in FIG. 8(*a*), when the preceding vehicle 33 is far away from the host vehicle, the following mark 31 is increased in brightness and displayed in a bright tone. This way, the following mark 31 is easily recognizable to the driver even when the preceding vehicle 33 to follow is far away from the host vehicle.

Figure 8B:
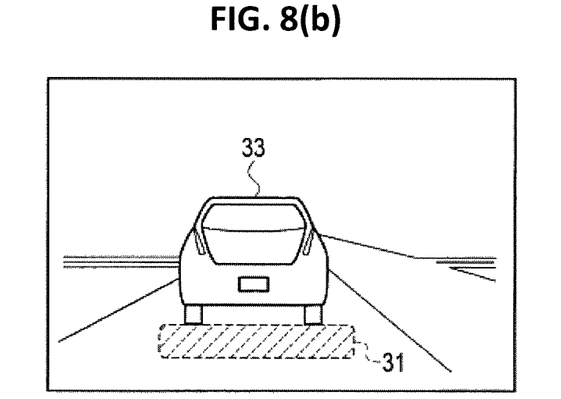

On the other hand, in the case where the distance between the preceding vehicle and the host vehicle is the predetermined distance L1 or shorter, the highlighting indication setter 17 lowers the highlight level by causing the brightness of the following mark 31 to be lower when the distance between the preceding vehicle and the host vehicle is short than when the distance is long. For example, as illustrated in FIG. 8(*b*), when the preceding vehicle 33 approaches the host vehicle, the following mark 31 is decreased in brightness and displayed in a dark tone. This way, the following mark 31 does not bother the driver even when the preceding vehicle 33 to follow approaches the host vehicle, and is still easily recognizable to the driver. Note that a combination of two or more of the above-described size, spatial frequency, and brightness of a highlighting indication may be used as the highlight level of the highlighting indication.

In Step S60, the HUD image generator 19 generates in the 3D space of the vehicle an image of the highlighting indication set by the series of processing described above, and outputs the image to the HUD display unit 5.

In Step S70, the HUD display unit 5 displays the image of the highlighting indication set in the vehicle's 3D space, on the display area provided so as to overlap with the position of the front window. Thereby, the image of the following mark is displayed over the preceding vehicle in a superimposing manner, and the driver sees the following mark beyond the front window. Once the following mark is thus displayed, the following mark display processing according to one or more embodiments of the present invention ends.

As described in detail above, the vehicular display apparatus 1 according to one or more embodiments of the present invention sets a highlighting indication to be displayed over a preceding vehicle in a superimposing manner, and causes the highlight level of the highlighting indication to be higher when the distance between the preceding vehicle and the host vehicle is long than when the distance is short. This enables the driver to easily recognize the highlighting indication even when the following-target preceding vehicle is far away from the host vehicle, and therefore achieves improvement in the visibility of the highlighting indication.

Further, in the case where the distance between the preceding vehicle and the host vehicle is a predetermined distance or shorter, the vehicular display apparatus 1 according to one or more embodiments of the present invention causes the highlight level of the highlighting indication to be lower when the distance between the preceding vehicle and the host vehicle is short than when the distance is long. This enables the driver not to be bothered by the highlighting indication even when the following-target preceding vehicle approaches the host vehicle, and therefore achieves improvement in the visibility of the highlighting indication.

Furthermore, the vehicular display apparatus 1 according to one or more embodiments of the present invention increases the size of the highlighting indication as the highlight level of the highlighting indication. This allows the highlighting indication to be displayed in a large size when the preceding vehicle is far away, and therefore achieves improvement in the visibility of the highlighting indication.

In addition, the vehicular display apparatus 1 according to one or more embodiments of the present invention increases the spatial frequency of the highlighting indication as the highlight level of the highlighting indication. This allows the spatial frequency to be increased when the preceding vehicle is far away, and therefore achieves improvement in the visibility of the highlighting indication.

In addition, the vehicular display apparatus 1 according to one or more embodiments of the present invention increases the brightness of the highlighting indication as the highlight level of the highlighting indication. This allows the brightness to be increased when the preceding vehicle is far away, and therefore achieves improvement in the visibility of the highlighting indication.

Note that the embodiments described above are merely examples of the present invention. Hence, the present invention is not limited to the above embodiments, and may of course be implemented in a mode different from the above embodiments by variously changing the above embodiments depending on design or the like without departing from the technical concept of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

1 vehicular display apparatus
3 control unit
5 HUD display unit (display unit)
7 preceding vehicle detection sensor
9 vehicle speed sensor
11 input interface
13 preceding vehicle detector
15 preceding vehicle distance calculator
17 highlighting indication setter
19 HUD image generator

The invention claimed is:

1. A vehicular display apparatus that, when a host vehicle follows a preceding vehicle in front, displays a highlighting indication used to highlight the preceding vehicle over the preceding vehicle in a superimposing manner, the vehicular display apparatus comprising:
   a preceding vehicle detector that detects the preceding vehicle travelling in front of the host vehicle;
   a preceding vehicle distance calculator that calculates a distance between the preceding vehicle detected by the preceding vehicle detector and the host vehicle;
   a highlighting indication setter that sets the highlighting indication to be displayed over the preceding vehicle in a superimposing manner, and causes a highlight level of the highlighting indication to be higher when the distance between the preceding vehicle and the host vehicle calculated by the preceding vehicle distance calculator is long than when the distance is short; and
   a head-up display that displays an image of the highlighting indication set by the highlighting indication setter, on a display area provided so as to overlap with a position of a front window of the host vehicle,
   wherein a size of the highlighting indication is based on a size of the preceding vehicle on an image, and
   wherein the highlighting indication setter increases the size of the highlighting indication as the distance between the preceding vehicle and the host vehicle increases.

2. The vehicular display apparatus according to claim 1, wherein the highlighting indication setter increases the size of the highlighting indication in a height direction.

3. The vehicular display apparatus according to claim 1, wherein as the highlight level of the highlighting indication, the highlighting indication setter increases a spatial frequency of the highlighting indication as the distance between the preceding vehicle and the host vehicle increases.

4. The vehicular display apparatus according to claim 1, wherein as the highlight level of the highlighting indication, the highlighting indication setter increases a brightness of the highlighting indication as the distance between the preceding vehicle and the host vehicle increases.

5. A vehicular display method performed by a vehicular display apparatus that, when a host vehicle follows a preceding vehicle in front, displays a highlighting indication used to highlight the preceding vehicle over the preceding vehicle in a superimposing manner, the method comprising:
- detecting the preceding vehicle travelling in front of the host vehicle;
- calculating a distance between the detected preceding vehicle and the host vehicle;
- setting the highlighting indication to be displayed over the preceding vehicle in a superimposing manner, and causing a highlight level of the highlighting indication to be higher when the distance between the preceding vehicle and the host vehicle is long than when the distance is short; and
- displaying an image of the thus-set highlighting indication on a display area provided so as to overlap with a position of a front window of the host vehicle,
- wherein a size of the highlighting indication is based on a size of the preceding vehicle on an image, and
- wherein the size of the highlighting indication is increased as the distance between the preceding vehicle and the host vehicle increases.

* * * * *